INVENTOR:
EDWARD S. SHANLEY

BY:
Beau, Brooks, Buckley & Beau,
ATTORNEYS.

2,945,196

ELECTRICAL TEMPERATURE RESPONSIVE DEVICE

Edward S. Shanley, Kenmore, N.Y., assignor to Food Machinery and Chemical Corporation, San Jose, Calif.

Filed Jan. 9, 1957, Ser. No. 633,340

2 Claims. (Cl. 338—28)

This invention relates to a temperature responsive device and particularly to such a device useful in the monitoring of chemicals in storage and during their reactions.

A variety of chemicals undergo decomposition upon being exposed to elevated temperatures or to catalytic impurities. This decomposition, which generally is accompanied by the evolution of heat, frequently becomes excessive and even violent in nature. In cases where excessive decomposition occurs, however, it normally is preceded by a series of minor disturbances in the system which take the form of localized and usually slight and temporary temperature fluctuations. These temperature fluctuations serve as warnings of impending major decompositions and accordingly it is important that they be detected early in order that corrective measures, such as addition to the system of stabilizers or in severe cases evacuation of the system, may be taken before wasteful and even dangerous decomposition takes place.

A temperature responsive device suitable for detecting the described minor disturbances in chemical systems must be capable of detecting slight temperature rises which may exist only temporarily and at isolated points within the system. Furthermore, the device must be such that having responded to the temperature rise it will emit a signal which continues even following return of the temperature to normal. It is also important that the temperature responsive device be free of mechanical moving parts which in time would undergo mechanical failure or which might be corroded by exposure to strong chemicals. No heretofore available device is known which possesses this combination of characteristics.

It is a feature of this invention to provide a temperature responsive device which is responsive to slight temperature rises which occur at isolated points within a chemical system, and which operates without the movement of mechanical parts.

It is a further feature of this invention to provide such a device which functions continuously after having been exposed even temporarily to a certain critical, elevated temperature.

In accordance with the above features of this invention, an electrically operative temperature responsive device is provided which is substantially a non-conductor so long as it is maintained below a certain critical temperature, and which is rendered permanently and highly electrically conductive when it is heated above that temperature. This device is useful in combination with an electrically actuated signal mechanism, e.g. an audio alarm system, a valve system for adding stabilizers to the system or evacuating the vessel in which it is contained, and the like, permitting the signal mechanism to be actuated when a system which is being monitored by the device undergoes even slight or localized temperature rises.

The temperature responsive device comprises a pair of electrodes separated by a body of salt hydrate which exhibits a major increase in electrical conductivity upon being melted. The salt hydrate is employed in an electrical system wherein in its substantially non-conductive state it serves to keep an electric circuit open, and after having been melted it provides a path for flow of electrical current thereby closing the circuit and making possible actuation of a signal mechanism. The various salt hydrates range in melting temperatures from below room temperature to moderately elevated temperatures, thereby making possible the provision of temperature responsive devices which are actuated at temperatures only slightly above normal storage or reaction temperatures, or at moderately elevated temperatures.

The herein temperature responsive device is a hermetically sealed system, the salt hydrate being sealed against the atmosphere in a container which may be shaped as desired to fit within a storage or reaction vessel. Melting of the salt hydrate at any point within the device is sufficient to create an electrically conductive path between the electrodes of the device, and accordingly a rise in temperature at any point within the storage or reaction vessel which is contiguous to the temperature responsive device is sufficient to close the electrical circuit which contains the device.

Figure 1:
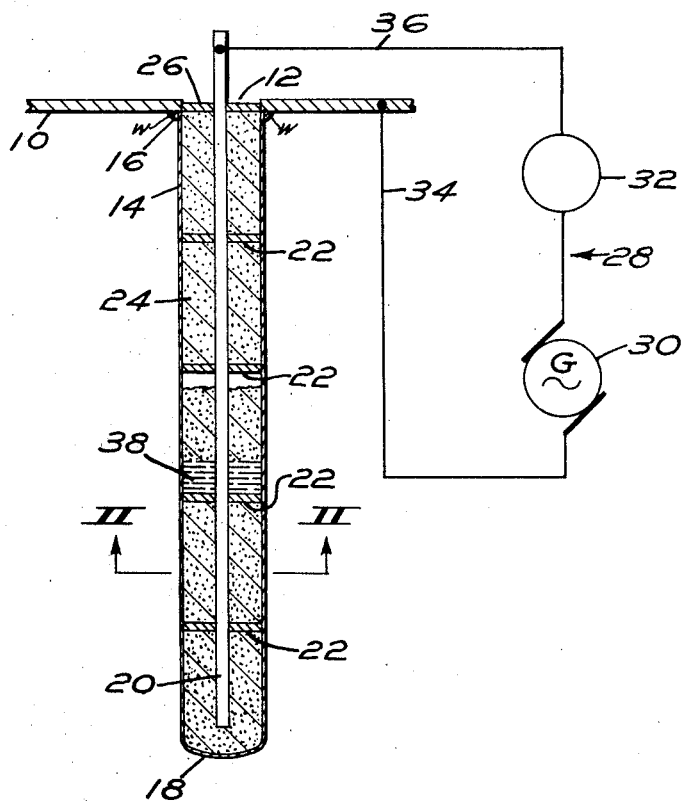
Fig. 1 is a longitudinal sectional view of a temperature responsive device according to the present invention.
Figure 2:
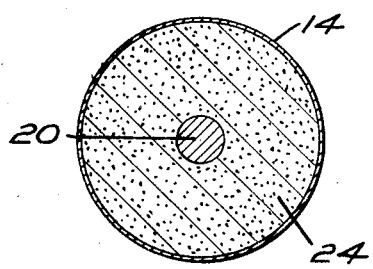
Fig. 2 is an enlarged sectional plan view of the device of Fig. 1 as indicated by line II—II in Fig. 1.

The temperature responsive device shown in Figs. 1 and 2 includes a mounting plate 10 having a central circular opening 12. Tube 14 is attached to and projects from the plate 10, upper end 16 of this tube being secured around its circumference to the inside edges of the circular opening in plate 10. The tube 14 is sealed at its lower end 18.

Conductor 20 is disposed within, and projects from open end 12 of, tube 14, being separated from the walls of the tube by spacers 22, suitably formed of vulcanized rubber. The annular space between the tube 14 and the conductor 20 is filled with a salt hydrate 24. The upper end 16 of tube 14 is closed to the atmosphere with a sealing member 26, suitably formed of a vulcanized rubber or plastic, thereby protecting the salt hydrate 24 from loss or gain of water by contact with dry or highly humid atmospheres and also from contamination by the surrounding environment.

Tube 14 and conductor 20 form the electrodes of an electrical circuit 28 which includes a source 30 of electrical current and a signal mechanism 32. Tube 14 is connected to the circuit 28 by lead wire 34, whereas conductor 20 is connected to the circuit with lead wire 36. The circuit remains open so long as the salt hydrate 24 which separates the tube and conductor electrodes 14 and 20, respectively, remains below its melting temperature. When the salt hydrate 24 at any location inside the tube 14 reaches its melting temperature and converts to a liquid 38, it becomes a conductor of electricity thereby creating a path for flow of electricity between electrodes 14 and 20 and permitting the circuit 28 to close. This causes the signal mechanism 32, which is connected into circuit 28, to operate for example by sounding an alarm, flashing a light, operating a valve which introduces stabilizer into the system being monitored, and the like.

The tube 14 is formed of an electrically conductive material, preferably stainless steel, aluminum and the like. This tube has a suitably thin wall, for example .005" to .010", to permit ready transfer of heat therethrough. The material of which the tube is formed must be impervious to attack by the environment in which it is to function. The plate 10 likewise preferably is formed of a conductive material, suitably of the same material as that from which the tube 14 is formed. Alternatively, this mounting plate can be formed of a non-conductive material, in which case lead wire 34 is affixed directly to the tube 14.

Conductor 20 likewise is formed of an electrically conductive material, and suitably may be in the form of a rod, a tube or a wire. This member must be resistant to attack by the salt hydrate employed, and where it protrudes from sealing member 26 outside the tube 14 it likewise should be resistant to attack by chemicals in the system which is to be monitored.

The spacers 22 serve to separate conductor 20 from the tube 14 thereby avoiding short-circuiting. However, they likewise serve as barriers to prevent molten salt hydrate 38 from flowing to the bottom of the tube 14. It will be apparent that the employment of spacers may be dispensed with, in cases where the salt hydrate is tightly packed within the tube or for example where the tube is of particularly small diameter or length. It is important that the electrodes of the temperature responsive device be separated by some means, however, and spacers 22 are well suited to perform this function.

It will be apparent that the herein temperature responsive device can be constructed otherwise than in the form shown in Figs. 1 and 2. For example the tube or container 14 can be formed of a non-conductor, in which case two conductors will be situated within the tube, being separated by the salt hydrate in obvious fashion. Other constructions for the present device will suggest themselves.

The salt hydrates useful herein are inorganic salts which contain water of crystallization. They are solid, dry-feeling materials which in the absence of free water are highly resistant to conduction of electrical current. It is important herein that they contain substantially no water other than water of hydration, in order that they will have suitably high electrical resistances prior to being melted.

At temperatures above their melting points the salt hydrates split off water of crystallization, forming a highly conductive solution of water and molten salt. Upon cooling to below their melting point, they do not reform salt hydrate, but rather separate into 2-phase systems comprising a saturated water solution of a portion of the salt and a phase of solid salt. The system as a whole remains conductive after the salt has cooled, the water-salt solution being an excellent conductor of electricity. Typical salt hydrates and their pertinent physical and resistance properties in an alternating current electrical circuit are shown in Table I which appears below. These materials and the other salt hydrates exhibit similar resistance properties in direct current electrical circuits. The table is merely illustrative of the materials suitable for use herein, and is not to be construed as limiting the scope of this invention.

nating or direct current as desired. The signal mechanism can be any common electrically operated mechanism which operates at a pre-selected current flow. One such signal mechanism comprises a relay switch which closes when the resistance of the salt hydrate drops below a predetermined level, and which by closing permits an alarm circuit to be completed. A number of other signaling devices will suggest themselves to one skilled in the art.

The following is illustrative of the change in current flow which takes place when a salt hydrate within an electrical circuit melts thereby becoming a substantial conductor of electricity. Consider a circuit comprising an alternating current source, a Wheatstone-type bridge, a resistance-indicating device, and containing the salt hydrate $Na_2CrO_4 \cdot 4H_2O$ as a resistance element of the circuit. This salt hydrate has a resistance in this system of 34,600 ohms. Its resistance after it has been melted and thereafter cooled below its melting point, however, is about 25 ohms. It will be apparent that this 1384 fold decrease in resistance in the salt hydrate resistance element would cause a large change in the current conducted by the system, in accordance with Ohm's law $I=E/R$, and would make the system well-suited to actuation of an electrically operated signal mechanism.

The herein temperature responsive device is of particular interest in detecting slight and localized, fluctuating temperature rises in liquid systems, for example in the storage of such chemicals as hydrogen peroxide or liquified petroleum gas, or in chemical reactions such as peracetic acid oxidation of olefins wherein the temperature of the chemical system must be maintained below certain relatively low levels. However, it also is useful in detecting temperature rises and providing a continuous signal thereof, in such apparatuses as fire detectors, in the storage of solids which are subject to spontaneous reactions with the evolution of heat, and the like. The particular salt hydrate and electrical system employed will depend on the particular application, with such obvious factors as the maximum temperature which the system may safely be permitted to reach, the shape and size of the system, the material within which the device is to be employed, and the like determining the choice of system to be employed.

Having described only typical embodiments of the herein temperature responsive device, we do not wish to be limited to the specific details thereof, but wish to reserve to ourselves any variations or modifications which fall within the scope of the following claims.

What is claimed is:

1. Electrically operative temperature responsive hermetically sealed device comprising 2 electrodes, a salt hydrate which is substantially a non-conductor of electricity disposed between and in contact with said elec-

*Table I*

| Salt Hydrate | Melting Temp., °C. | As Hydrate | | Resistance [1] Melted | | Cooled | |
|---|---|---|---|---|---|---|---|
| | | t, °C. | R=ohms | t, °C. | R=ohms | t, °C. | R=ohms |
| $Ca(NO_3)_2 \cdot 4H_2O$ | 42 | 27 | 10,000 | 43 | 24 | 27 | 145 |
| $Na_2SO_4 \cdot 10H_2O$ | 32 | 28 | 25,000 | 32 | 40 | 27 | 330 |
| $Ba(OH)_2 \cdot 8H_2O$ | 78 | 30 | Infinite | 79 | 10 | 30 | 12 |
| $Na_2CrO_4 \cdot 4H_2O$ | | 29 | 34,600 | 70 | 18 | 29 | 25 |
| $KF \cdot 2H_2O$ | 41 | 30 | 4,400 | 41 | 10 | 28 | 14 |

[1] Resistances were determined on samples packed in a ⅝" I.D., 6' long stainless steel test tube which served as an electrode in a conventional Wheatstone bridge circuit. The other electrode was a ⅛" diameter stainless steel rod centrally located in the tube and separated therefrom by the salt hydrate sample. A rubber gasket was used to seal the tube from the atmosphere.

The electrical circuit 28 contains an electrical current source 30 and a signal mechanism 32. The electrical current source 30 can provide to the system either altertrodes, and means hermetically sealing said salt hydrate from the atmosphere, said salt hydrate being convertible to a permanently, highly electrically conductive system by being melted and retaining a high degree of electrical conductivity upon cooling to a temperature below that temperature at which it melted and become conductive.

2. Electrically operative temperature responsive hermetically sealed device comprising a tubular outer electrode, an inner electrode spaced within said tubular outer electrode, a salt hydrate which is substantially a nonconductor of electricity disposed between and in contact with said electrodes, and means hermetically sealing said salt hydrate from the atmosphere, said salt hydrate being converticle to a permanently, highly electrically conductive system by being melted and retaining a high degree of electrical conductivity upon cooling to a temperature below that temperature at which it melted and became conductive.

References Cited in the file of this patent

UNITED STATES PATENTS

| | | |
|---|---|---|
| 856,162 | Kitsee | June 4, 1907 |
| 2,316,872 | Kernen | Apr. 20, 1943 |
| 2,413,125 | Walbridge | Dec. 24, 1946 |
| 2,477,348 | Postal | July 26, 1949 |
| 2,487,526 | Dahm et al. | Nov. 8, 1949 |
| 2,495,867 | Peters | Jan. 31, 1950 |
| 2,546,415 | Alcock | Mar. 27, 1951 |
| 2,804,610 | Curtis | Aug. 27, 1957 |